United States Patent [19]

Gerber

[11] Patent Number: 4,475,203
[45] Date of Patent: Oct. 2, 1984

[54] MEMBRANE WINDOW FOR HIGH ENERGY LASER ENCLOSURE

[75] Inventor: Wesley D. Gerber, Mission Viejo, Calif.

[73] Assignee: Ford Aerospace and Communications Corp., Detroit, Mich.

[21] Appl. No.: 305,074

[22] Filed: Sep. 24, 1981

[51] Int. Cl.³ .............................................. H01S 3/08
[52] U.S. Cl. .................................................. 372/103
[58] Field of Search ................. 372/33, 103, 104, 107, 372/101, 98, 99; 350/319, 163, 164

[56] References Cited

U.S. PATENT DOCUMENTS

| | | | |
|---|---|---|---|
| 3,717,823 | 2/1973 | Abdale et al. | 372/103 |
| 3,902,136 | 8/1975 | Finkleman | 372/104 |
| 3,906,396 | 9/1975 | Cooley | 372/33 |

Primary Examiner—William L. Sikes
Assistant Examiner—Léon Scott, Jr.
Attorney, Agent, or Firm—Paul K. Godwin, Jr.; Robert D. Sanborn

[57] ABSTRACT

In a housing for a high energy laser, an aperture is formed to allow projection of the beam from the laser. A transparent membrane is attached over the aperture in order to prevent contaminants from entering the housing and provide a low cost, low distortion window to the projected beam.

8 Claims, 2 Drawing Figures

MEMBRANE WINDOW FOR HIGH ENERGY LASER ENCLOSURE

BACKGROUND OF THE INVENTION

1. Field of the Invention:

The present invention is directed to the field of optical windows and more specifically to those windows which are able to transmit high energy radiation.

2. Description of the Prior Art:

High energy laser (HEL) weapons systems are discussed as utilizing sources, such as DF and $CO_2$ lasers to generate beams having power densities on the order of 30 w/cm$^2$ and greater and having diameters in the range of from 0.4 to 4 meters. Due to the large size of the source required to generate such a large beam, it is most practical to provide a beam pointing subsystem external to the source in order to expand and control the direction of the beam from the weapon carrier (aircraft, ship, satellite or ground vehicle) towards a designated target.

Such a beam pointing subsystem must, by necessity, be lightweight, fast and accurate. As part of the beam pointing subsystem, a protective housing must also be provided as a barrier between the outside environment and a controlled internal environment. Such a housing also prevents direct damage to the beam pointing optics and should also reduce the amount of dust and other contaminants that would degrade the beam pointing optics.

The protective housing must also provide a means for allowing unaltered transmission of the beam from the beam pointing subsystem to a designated remote target. Several alternative systems have been proposed to provide a beam transmission port, including solid state windows, aerodynamic windows and open-port (positive pressure) systems.

A solid state window is most highly desired, due to its inherent ability to maintain the internally mounted optics free from contamination and allow for a controlled inner environment to be maintained within the housing. However, very few materials exist which possess suitable characteristics. Due to the very large size of the transmission port aperture, and the large amount of energy contained in the HEL beam, solid state rigid materials provide a very limited solution. Solid material windows of such a large area must necessarily be thick in order to provide the required strength to be self-supporting. This, in turn, results in excessive losses, and distortions; and introduces the possibility of fracture due to the energy absorbed from the beam. The additional mass, due to such a heavy window, degrades performance of the pointing system. In addition, fabrication techniques applicable to optical quality windows of this size are not presently available. Segmenting such window material results in additional losses due to the supporting struts which must necessarily be inserted between segments. Furthermore, an additional optical degradation may occur due to possible segment misalignments.

The use of aerodynamic window technology is shown in U.S. Pat. No. 3,902,136 in which a rotating bladerow is employed to maintain the internal high pressure gas within a laser and preventing it from passing to the surroundings that are at a lower pressure. Such a system, of course, allows for the elmination of any solid material in the aperture of the laser. On the other hand, the system requires a sophisticated mechanism to provide the drive for the rotating bladerow that, in the case of the large aperture discussed above, may be difficult to implement in view of the size and weight restrictions that must necessarily be considered.

An open-port (positive pressure) system also eliminates the solid window mentioned above but, at the same time, requires a large supply of uncontaminated air to be pumped into the housing. For an aperture the size of that discussed above, a considerable volume of air would be required to be pumped into the housing and would not allow for one to utilize an inert atmosphere. In both cases above, required pressures and resulting flow-rates would, of necessity, have to exceed outside wind conditions to provide the required protection. As a result, the high levels of turbulence thus induced significantly degrade the beam traversing that region.

SUMMARY OF THE INVENTION

The present invention provides for a membrane window which has the advantages of the solid material windows of the prior art, including the ability to maintain an interface between outside and inside environments of the housing, while overcoming most of the disadvantages of the solid material window by providing a low absorption material that is lightweight and not subject to fracturing.

It is therefore an object of the present invention to provide an inexpensive lightweight window material that is capable of being placed over large aperture HEL transmission ports and which is readily replaceable, while providing the necessary closure with minimum degradation of the existing beam.

It is another object of the present invention to provide a rapid and efficient replacement mechanism with which to provide a membrane material for covering a large aperture transmission port, wherein the material is supplied from a bulk roll of that material and mounted on the protective housing in which the transmission port is formed.

DETAILED DESCRIPTION OF THE INVENTION

Figure 1:
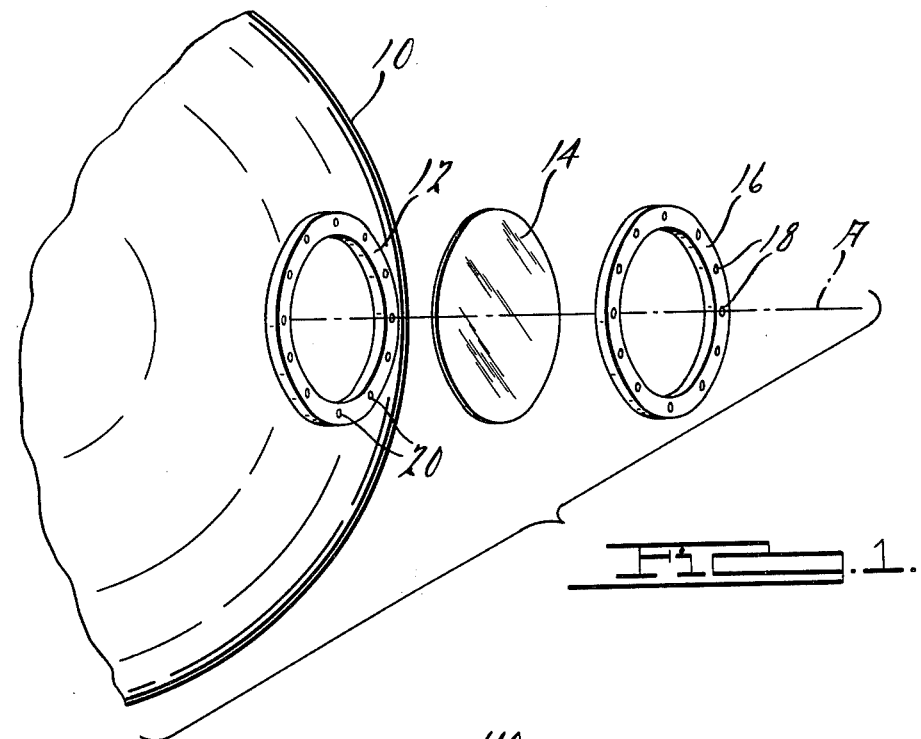
FIG. 1 is a conceptual view of a first embodiment of the present invention.

A first embodiment of the present invention is shown in FIG. 1 as being installed on a housing 10, of the type which is used to provide protection to a high energy laser weapon system (not shown). An aperture is defined in the housing 10 to allow projection of the high energy beam transmission along an axis A by the system note above A. A ring support 12 is mounted so as to surround the aperture and includes a plurality of tapped holes 20. A membrane film 14, such as a 0.0005 inch thick vinylidene chloridevinyl chloride copolymer, is selected so as to be transparent to the transmitted wavelength and is stretched over the ring support 12. An outer ring 16 is clamped onto the ring support 12 via bolts or other fasteners inserted through holes 18, into tap holes 20. The stretched membrane film 14 is therefore clamped in place between the ring support 12 and the outer ring 16, thereby maintaining a transmitting interface between the internal controlled environment of the housing 10 and the external environment.

Figure 2:
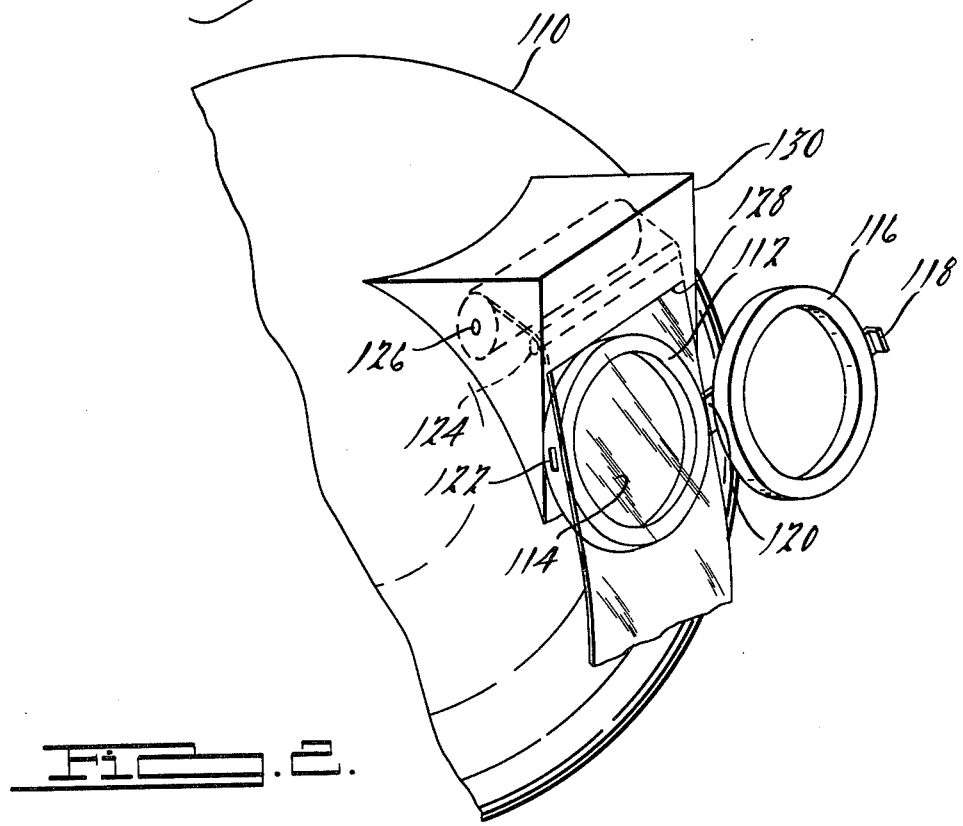
FIG. 2 is a conceptual view of a second embodiment of the present invention.

A second embodiment of the present invention is shown in FIG. 2 and includes the membrane film 114 supplied from a roll 126 of membrane film. In that embodiment, the membrane film 114 is stretched over an apertured ring support 112 and is clamped thereto via a ring clamp 116. The ring clamp 116 is attached to the ring support 112 by a hinge 120 and a clasp 118 connecting to a catch 122.

The supply of membrane film is stored on a role 126 mounted external to the housing 110 and internal to a protective covering 130 mounted adjacent the ring support 112. A guide roller 124 is suitably mounted in the cover 130 so as to allow one to draw the membrane film through a slot 128 in the front of the cover 130 from the roll 126 and drape the film over the ring support 112.

In the event of damage or perforation of the membrane film stretched across the aperture, the removal and replacement of a new membrane film covering the aperture is a relatively simple and fast procedure. This embodiment would provide, at the very least, a rupture-diaphragm capability, providing full protection until a vaporization of the material occurred.

In order to prevent internal reflections within the housing frame of the membrane, antireflective materials are coated onto the membrane surfaces. This should be done to both surfaces. In addition, anti-static processes should be incorporated to minimize any propensity of the film to collect dust and other contaminants.

The present invention has several advantages over the prior art techniques in providing a transparent interface in high energy laser weapon systems, since the long-molecule organic materials of the membrane film allow one to cover a very large area with a strong, lightweight material at nominal cost. Furthermore, due to the nature of the membrane, which may be on the order of from approximately 0.5 to 5 mils (0.01–0.12 mm) thick, the membrane has very low total absorption and a fairly efficient capability of heat transfer to the outside atmosphere. Applicant has experimentally determined that, in an environment where excessive heating occurs sufficient to cause perforation of the membrane, forced air movement across the outside membrane surface will dissipate sufficient heat to prevent that damage from reccuring due to heat buildup within the material. Furthermore, the thin nature of the membrane precludes any significant amount of distortion of the transmitted beam while at the same time preventing the entry of contaminants into the internal environment of the housing. Consistent with military practice, a removable armor-plated cover is envisioned as additional protection for use during transportation storage or when otherwise not in an active engagement mode.

It will be apparent that many modifications and variations may be effected without departing from the scope of the novel concept of this invention, therefore, it is intended by the appended claims to cover all such modifications and variations which fall within the true spirit and scope of the invention.

I claim:

1. In combination with a means for projecting a high energy beam of electromagnetic energy,
   a housing provided in a surrounding relationship to said projecting means in a sealed condition to prevent contaminants from entering said housing, and
   an open aperture in said housing to allow said beam to be projected from said housing,
   an improvement comprising:
   a membrane of sheet material being transparent to the wavelength of said projected beam and covering said open aperture to maintain said housing in said sealed condition.

2. The improved combination as in claim 1, wherein said aperture is defined by an open frame attached to said housing and said membrane is clamped within said frame.

3. An improved combination as in claim 2, wherein said membrane covering said aperture is supplied from a roll of sheet material stored in an adjacent position to said frame.

4. The improved combination as in claim 2, wherein said sheet material is coated on at least one side with an anti-reflection coating material.

5. The improved combination as in claim 2, wherein said sheet material is copolymer vinylidene chloridevinyl chloride having a nominal thickness in the range of approximately 0.5–5 mils (0.01–0.12 mm).

6. A protective housing for isolating means for generating a beam of electromagnetic energy from an external environment, wherein said housing includes open aperture means for allowing said beam of electromagnetic energy to be transmitted into said external environment and said open aperture means includes the improvement of a membrane of sheet material transparent to said electromagnetic energy disposed between said generating means and said external environment.

7. A protective housing, as in claim 6, wherein said generating means is a high energy laser.

8. A method of isolating an electromagnetic beam generator from an external environment including:
   providing open aperture protective housing about said generator and the improvement of providing a membrane of sheet material, transparent to electromagnetic energy from said generator, and disposing said membrane material on over said open aperature said housing so as to allow said electromagnetic energy to be transmitted to said external environment.

* * * * *